April 16, 1968    J. W. EDGEMOND, JR    3,377,786
SHAKING MECHANISM
Filed Oct. 28, 1963    4 Sheets-Sheet 1
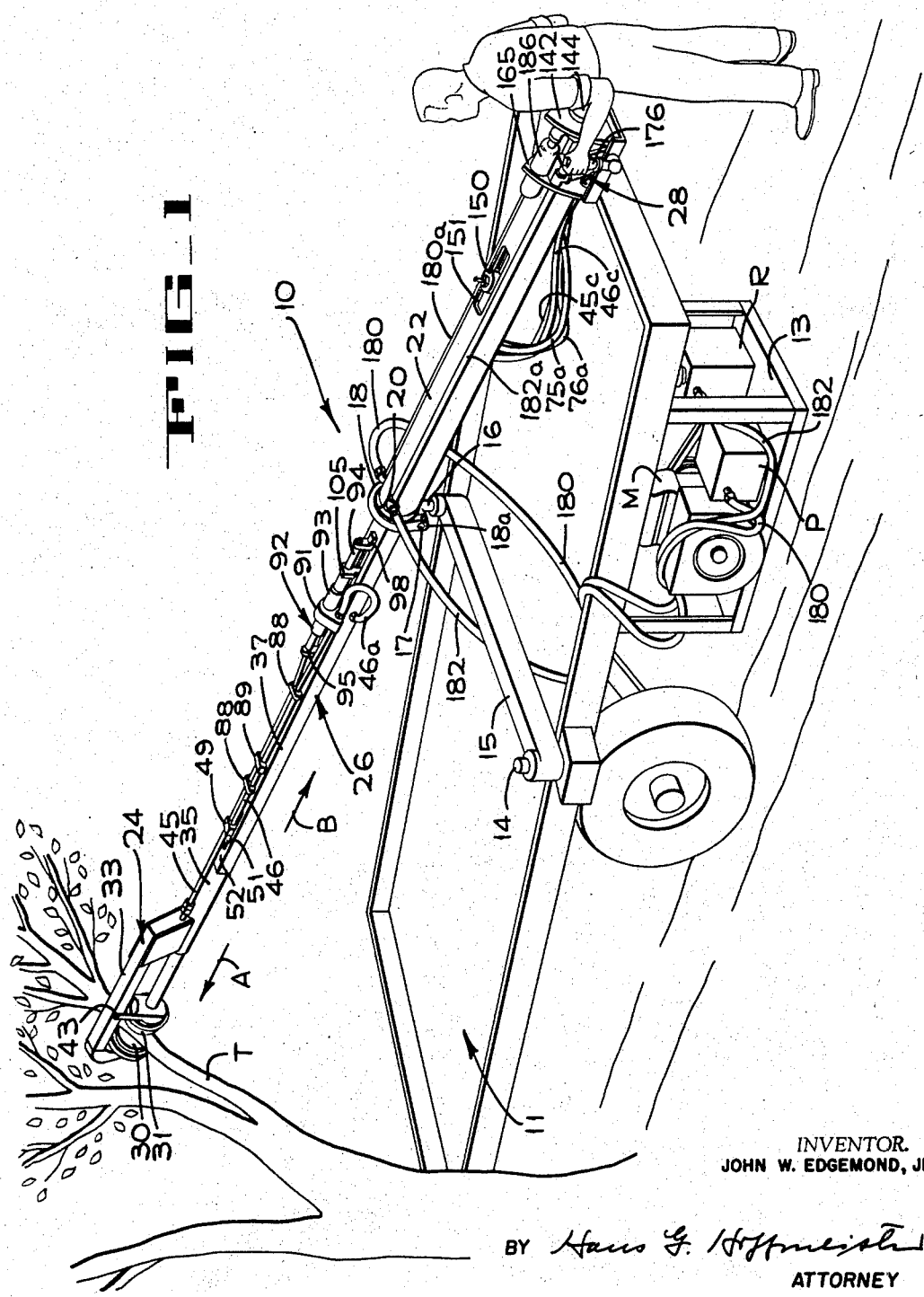
INVENTOR.
JOHN W. EDGEMOND, JR.
BY *Hans G. Hoffmeister*
ATTORNEY

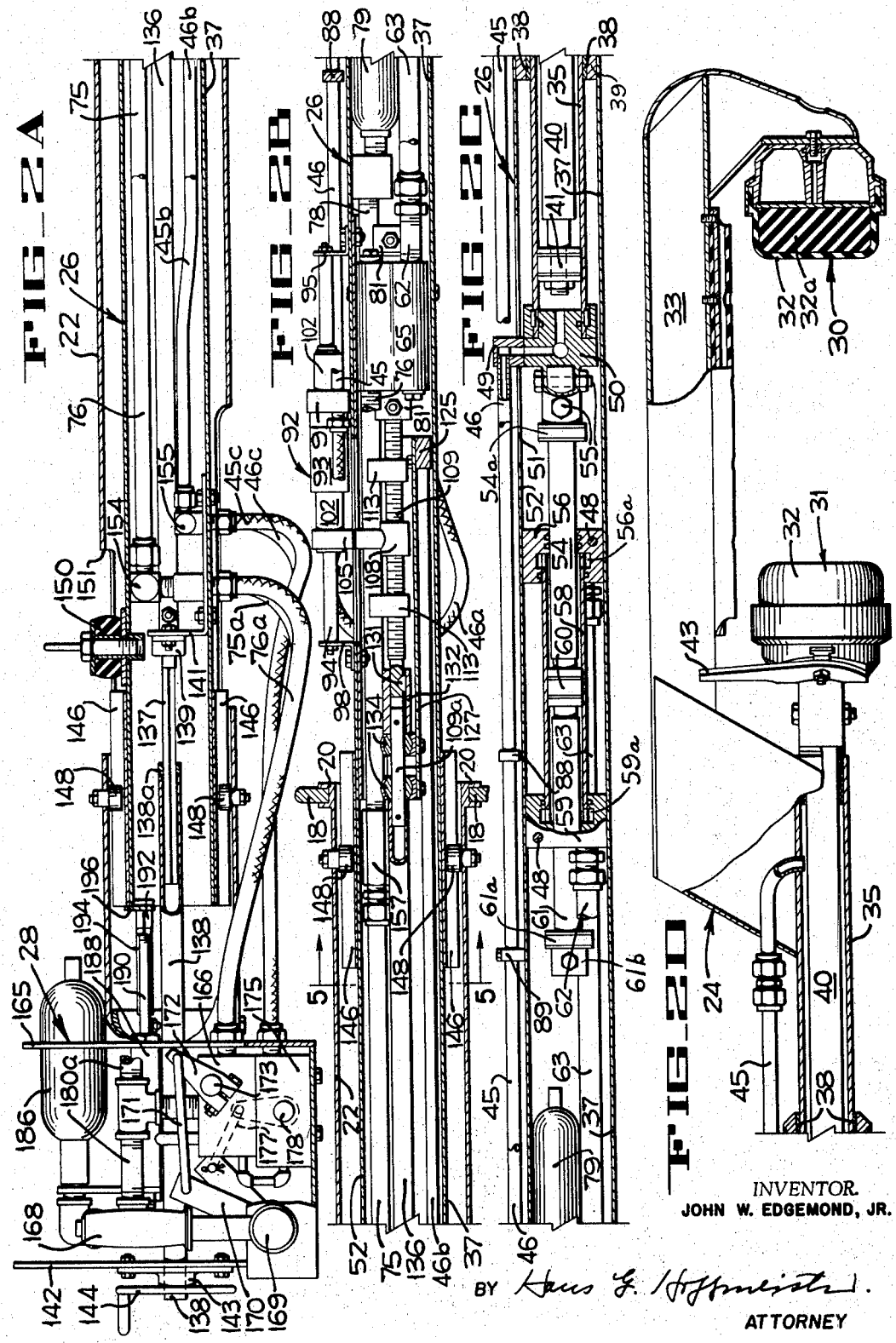

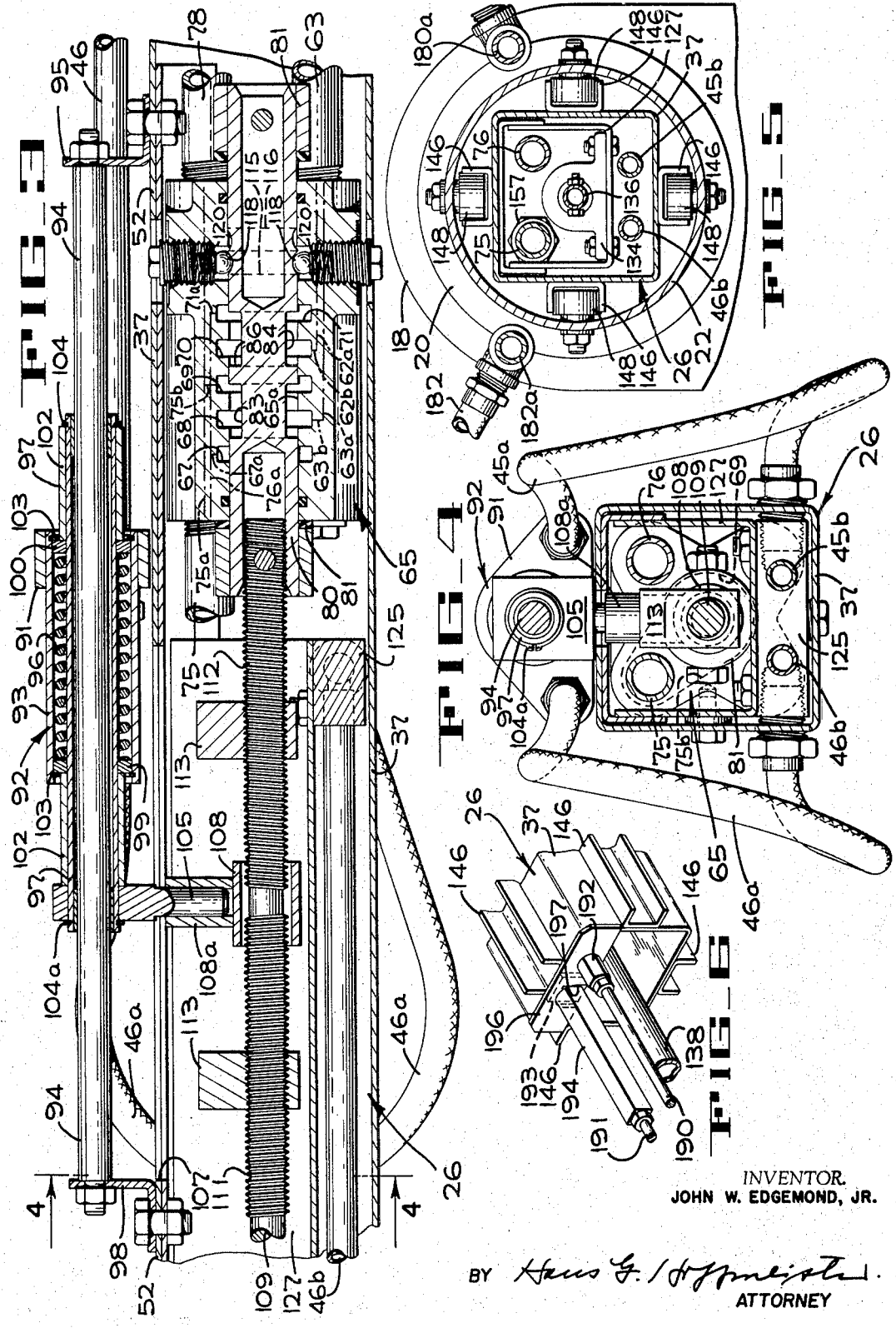

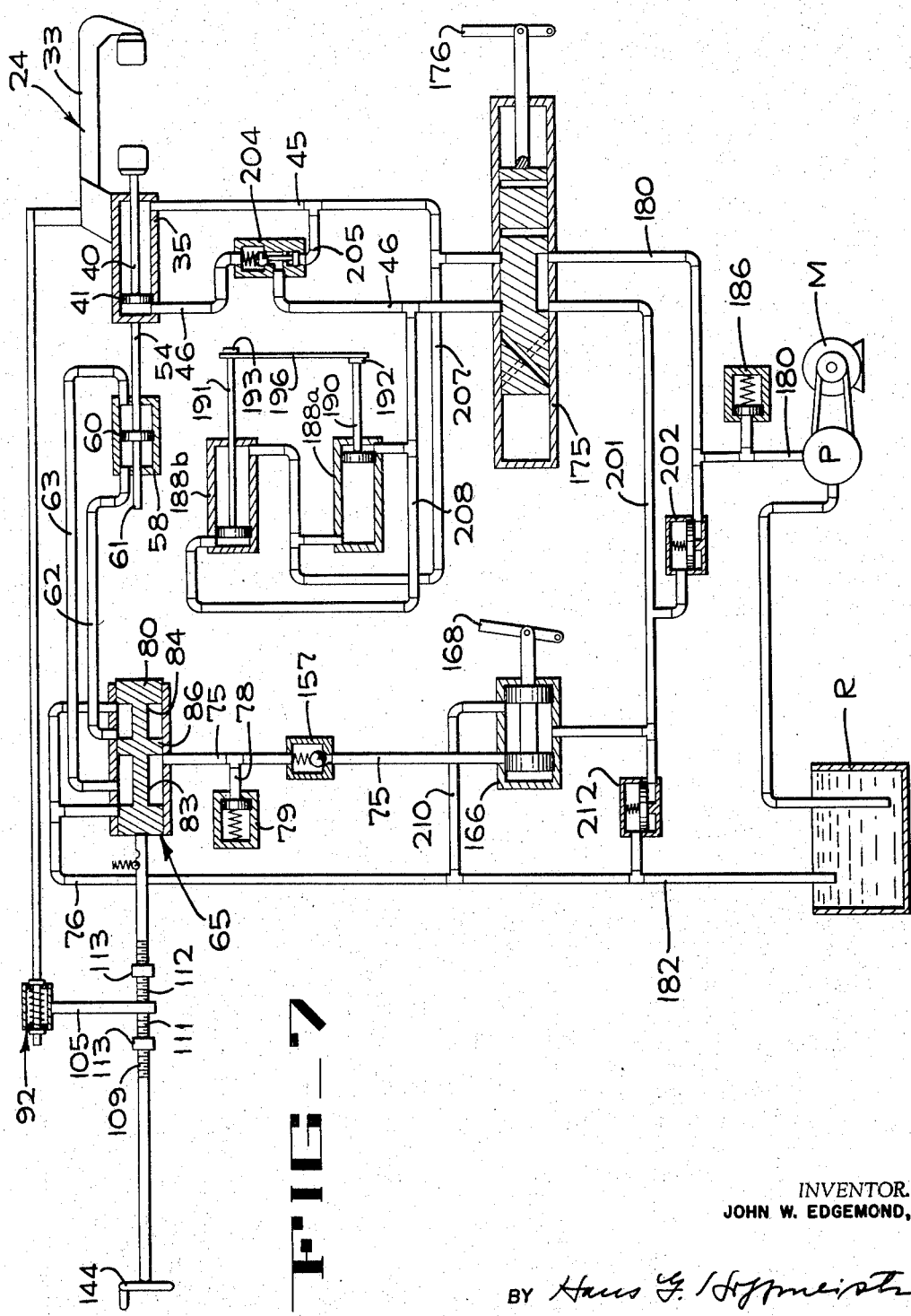

United States Patent Office 3,377,786
Patented Apr. 16, 1968

3,377,786
SHAKING MECHANISM
John W. Edgemond, Jr., Los Gatos, Calif., assignor to FMC Corporation, San Jose, Calif., a corporation of Delaware
Filed Oct. 28, 1963, Ser. No. 319,388
14 Claims. (Cl. 56—328)

The present invention pertains to a mechanism for shaking or vibrating tree limbs and other members that must be rapidly reciprocated, and more particularly to a hydraulically operated shaking mechanism whereby a positive shaking force is applied in both a forward and a reverse direction to apply shock forces to an object gripped by said mechanism.

While the present invention was specifically designed as a tree shaking mechanism to overcome some of the problems of fruit and nut harvesting, it will be obvious that the principal components and the basic principles of operation of the shaking mechanism may be put to practical use in other diverse fields. For example, the shaking mechanism may be used as a testing device for various equipment wherein the generation of high shock forces is required.

One area in which the generation of large shock forces has elicited particular interest is the fruit and nut harvesting industry. With the increasing cost of labor, this industry has been engaged in a search for a practical mechanical means for harvesting fruit, primarily through the extended research and development of tree shaking mechanisms. These mechanisms are designed to shake the trunk or limbs of a tree to dislodge the fruit through the inertia forces generated between the body of the fruit and its stem or other attachment to the tree limb. The prior art in this field reveals two basically different types of tree shakers. One of these is the impact type which provides separation of the fruit from the tree through single, successive impacts, all in the same direction. The second basic type of tree shaking device can be defined as a "true" shaking mechanism, that is, a mechanism which drives the tree limbs back and forth with a frequency and amplitude or stroke sufficient to provide the necessary separating forces between the fruit and their stems. This type of shaking mechanism is therefore cyclic in nature and may be powered by a reciprocating piston, or more commonly, it may be driven by a rotary crank shaft or eccentric rotating mass.

The present invention is concerned with the second basic type of tree shaker, or "true" shaking mechanism, where the tree trunk or limb is positively gripped and moved alternately in opposite directions. Furthermore, the present invention utilizes a reciprocating piston type of shaker since the motion of this piston does not have to conform to any harmonic or sinusoidal motion as is the case with a rotary mechanism. Therefore, pulsating or irregular types of movement may be imparted to the reciprocating piston to produce the most effective fruit dislodging forces. The maximum separation forces for a given shaking mechanism input power are attained by the maximum acceleration and deceleration rates of the piston, that is to say, by applying the available energy in certain minimum time intervals. The present invention utilizes a hydraulic system as the best method for controlling the piston in order to achieve this concept wherein the piston, travelling at a high velocity, is decelerated and moved in a reverse direction with a maximum initial acceleration, all in a minimum period of time.

One object of the present invention is, therefore, to provide an improved hydraulic operating system for a two-way powered piston whereby maximum acceleration and deceleration forces are achieved at the ends of the piston stroke.

Another object of the present invention is to provide a reciprocating-piston type shaking mechanism wherein the length of the stroke may be adjusted while the mechanism is in operation. In the case of a tree shaking mechanism, this is of particular importance since the shaking mechanism must be adjusted for the particular stiffness of the tree or limb encountered in order to obtain the necessary separation forces for fruit removal.

Another object of the present invention is to provide a hydraulic operating system for a piston-driven shaking mechanism whereby the frequency of the piston movement may be varied inversely with the length of its stroke automatically by a stroke adjustment, or whereby the frequency may be adjusted independently up to a maximum frequency-amplitude ratio.

Another object of the present invention is to provide a means within a hydraulic system for driving a power piston to retain the kinetic energy of deceleration by converting it to potential energy, storing it, and returning it to the system during the acceleration portion of the piston cycle.

Another object is to provide a reaction mass movement within a shaking mechanism whereby the shock forces which are generated are isolated from the operator and the mechanism supporting structure.

Another object of the present invention is to provide an improved tree shaking device which uses a hydraulically reciprocated piston for oscillating a tree limb and a clamping mass in forward and reverse directions.

Another object is to provide a tree shaking mechanism which includes a centering device for assuring that each limb or tree trunk to be shaken will be initially centered when it is gripped by the mechanism so that during the shaking stroke, it will be moved approximately equal distances in both directions from its normal, unrestrained position.

Other objects and advantages of the present invention will become apparent from the following description and the accompanying drawings in which:

FIGURE 1 is a perspective showing the shaking mechanism of the present invention in operating position for shaking or vibrating a tree limb.

FIGURES 2A, 2B, 2C, and 2D when combined, make up an enlarged vertical section through the shaking mechanism of FIGURE 1, extending from the operating end of the mechanism to the tree gripping end of the mechanism.

FIGURE 3 is an enlarged vertical section of a portion of the apparatus shown in FIGURE 2B.

FIGURE 4 is a section taken along lines 4—4 of FIGURE 3.

FIGURE 5 is an enlarged section taken along lines 5—5 of FIGURE 2B.

FIGURE 6 is a fragmentary isometric showing the boom centering device of the present invention.

FIGURE 7 is a schematic illustration of the hydraulic system for operating the shaking mechanism of the present invention.

A particularly important feature of the present invention is the hydraulic system which operates a piston to achieve maximum shock forces at each end of the piston stroke. The operating characteristic of this hydraulic system are: first, that the deceleration period is as short as possible within the design and power limitations of the mechanism; and second, that the kinetic energy of deceleration is stored in the system and later returned to it to effect the maximum initial acceleration. This hydraulic system is embodied in the tree shaking mechanism of the present invention.

In FIGURE 1 the shaking mechanism is identified by reference numeral 10 and is pictorially shown in operating position to shake a tree limb T. The shaking mechanism is mounted upon a catching frame 11 adapted to receive the fruit shaken from the tree. Power and fluid supply units for the shaking mechanism are mounted upon a platform 13 below the catching frame and include a motor M, a pump P, and a hydraulic fluid reservoir R. The shaking mechanism is mounted upon the catching frame by means of a rigid arm 15 pivotally mounted upon a shaft 14 projecting upwardly from one side of the frame. The distal end of arm 15 carries a pivot unit 16 which includes a shaft 16 that is mounted for pivoting about a generally vertical axis in a socket in arm 15. Near its upper end the shaft has a tubular mounting member that rotatably journals a shaft 17 which is pinned to two hub members 18a (only one being shown) of a generally circular guide ring 18. The guide ring is rotatably mounted within the confines of a channel 20 (FIGS. 1 and 2B) which defines one end of a cylindrical housing 22 that serves to mount the shaking mechanism. It can be seen, therefore, that the shaking mechanism, through its housing 22, is rotatable about its own axis by means of the rotatable channel 20, about the vertical axis of the shaft 16, about the horizontal axis of the arm shaft 17, and about the vertical axis of the shaft 14. Thus, the tree shaking mechanism may be adjusted within a relatively large area to grip various limbs or branches which are to be shaken.

The main operating components of the shaking mechanism include a gripping assembly 24, a boom 26, and the cylindrical housing 22 which includes the control section 28 of the mechanism. The gripping assembly 24 is positively moved in both forward and rearward directions to oscillate the tree limb T. The boom 26 slidably carries the gripping assembly and comprises a reaction mass therefor. That is to say, when the gripping assembly is driven in the direction of arrow A (FIG. 1), the boom 26 will be propelled in the opposite direction as indicated by the arrow B due to its reaction to the force imposed on the gripping assembly. The boom 26 is slidably received within the housing 22. In this manner, the shaking forces generated upon the gripping assembly are cancelled by the reaction movement of the boom and are thereby isolated from the mounting structure and the operator. It is, of course, obvious that such a mounting system for the shaking mechanism is highly desirable since it permits the operator to maintain better control of the mechanism and permits a more flexible supporting structure.

The more specific components of the shaking mechanism 10 are shown in FIGURES 2A, 2B, 2C, and 2D. The gripping assembly 24 (FIG. 2D) includes a pair of opposed limb gripping pads 30 and 31 each of which has a relatively non-stretchable cover 32 enclosing a yieldable mass 32a. The outermost pad 30 (FIG. 2D) is secured to a C-shaped supporting structure 33, the rearward end of which is secured to a longitudinally projecting clamp cylinder 35 which is slidably mounted by means of slide bushing 38 within an end closure plate 39 of a housing 37 which is generally square in cross-section and defines the boom 26.

Positioned within the clamp cylinder 35 is a piston rod 40 and a piston 41 (FIG. 2C), the piston rod extending forwardly to a position within the C-shaped supporting structure 33 and serving to mount the resilient clamping pad 31 at its distal end. Under hydraulic actuation of the piston 41, the clamping pad 31 is caused to move toward the fixed clamping pad 30 to securely grip a tree limb or other object therebetween. Clamping pad 31 is prevented from rotating about its axis by means of a pair of guide elements 43 (one only being shown) that are attached to either side of the clamping pad and are disposed in guided, sliding engagement with opposite sides of the longitudinally extending supporting member 33.

The clamping pads are moved to their open position shown in FIGURE 2D when hydraulic fluid is received within the cylinder 35 from a conduit or pipeline 45 entering at the forward end of the cylinder. When it is desired to move the clamping pad 31 into its gripping position, hydraulic fluid is caused to enter the cylinder 35 at its rearward end from a pipeline 46 which extends parallel to the pipe 45 and is disposed behind pipe 45 in FIG. 2C. The end of pipe 46 is welded to a block 49 that extends through the wall of housing 37 and is bolted to a cylinder head 50 disposed inside the housing. Pipe 46 communicates with the interior of cylinder 35 through passages in the block 49 and the head 50. When fluid is directed into cylinder 35 through pipe 46 to one side of piston 41, the fluid within the cylinder on the other side of piston 41 is exhausted through the pipeline 45. The mounting block 49 and head 50, serve to mount the hydraulic pipelines 45 and 46 and the rearward end of the clamp cylinder 35. The mounting block 49 projects to the exterior of the boom housing 37 through a slot 51 in the upper surface 52 of the housing 37, (FIGURES 1 and 2C).

The rearward end of the cylinder head 50, which is slidable within the boom housing 37, is secured to a piston rod 54 by means of bolts 55, said piston rod being slidably received within a cylinder head 56 and extending to the interior of a power cylinder 58 which controls the shaking movement of the gripping assembly 24. The power cylinder is fixedly mounted within the boom housing by means of the cylinder head 56 and a similar cylinder head 59, both of which are secured to the housing by bolts 48 and are secured to each other by three long bolts (not shown). Slidable within the power cylinder is a piston 60 which is secured to the end of the piston rod 54. Movement of piston 60 therefore serves to move the entire gripping assembly 24. That is to say, when the piston 60 is reciprocated within the power cylinder, the clamping cylinder 35 which holds the clamping pads 30 and 31 in locked engagement on the three limb is also reciprocated along with the three limb. In order to prevent possible binding of the piston 60 within the power cylinder, it is provided with a second piston rod 61 which slidably extends through the cylinder head 59. A bumper assembly 61a is disposed on rod 61 between the cylinder head 59 and a collar 61b secured to rod 61. A bumper assembly 54a is disposed on rod 54 between cylinder head 56 and the rearward end of mounting block 50. The bumper assemblies 54a and 61a are identical and each includes a central rubber pad.

The power cylinder 58 alternately receives pressurized fluid at its opposite ends from a hydraulic line 62 entering the rearward end of the cylinder through cylinder head 59 and from a line 63 entering the forward end of the cylinder through cylinder head 56 (FIG. 2C). The hydraulic lines 62 and 63 are connected to the cylinder heads by standard fittings and communicate respectively with chambers 59a and 56a respectively. The lines 62 and 63 extend in parallel relationship along the lower interior surface of the boom housing 37 to a shuttle valve 65 (FIGS. 2B and 3) wherein the alternate feeding of the hydraulic fluid to opposite ends of the cylinder is accomplished.

The shuttle valve 65 is shown in detail in FIGURE 3. The hydraulic lines 62 and 63 are threaded into separate tapped openings in the forward lower end of the shuttle valve. Line 62 communicates with a longitudinal passage indicated by phantom line 62a which communicates with an annular groove 70, formed in the wall of a central chamber 65a of the valve 65, through a radial passage indicated by phantom line 62b. Similarly, line 63 communicates with a longitudinal passage indicated by phantom line 63a and a radial passage 63b that communicates with an annular groove 68 in the valve wall. Three other annular grooves 67, 69 and 71 are also formed in the valve wall. The groove 69 communicates with a radial passage 75b, and a longitudinal passage 75a that leads to a conduit 75 which is connected to a source of fluid under pressure. In FIG. 4 the radial passage 75b is indicated in dotted lines. This passage, which is typical of all passages leading to the annular grooves 67–71, tapers from a width equal to the diameter of the associated annular groove to a width slightly greater than the diameter of the associated longitudinal passage which may be of the same size as the conduit which it serves.

The annular grooves 67 and 71 communicate through radial passages 67a and 71a respectively with a longitudinal passage 76a that leads to a conduit 76 (FIG. 4) which is arranged to return fluid to a reservoir. A conduit 78 (FIG. 2B), which is connected to a surge tank or shock accumulator 79, also communicates with the longitudinal passage 75a.

Mounted within the shuttle valve chamber 65a and adapted to have slight axial movement is a spool 80 which is provided with stop collars 81 at each end. The center of the spool includes two annular grooves 83 and 84 which are separated by an annular valve 86. As previously mentioned, the annular passage 68 communicates with the forward end of the power cylinder through the line 63 and the annular passage 70 communicates with the rearward end of the power cylinder through line 62. The outermost annular passages 67 and 71 communicate with the exhaust line 76 returning the spent fluid to the reservoir R to be recirculated through the system. Incoming hydraulic fluid under pressure entering the shuttle valve from the main feed line 75 is directed into the centrally located annular passage 69, and, by the relative position of the valve 86, this fluid will be directed to either the forward or the rearward end of the power cylinder. In the position shown in FIGURE 3, therefore, the incoming fluid entering the shuttle valve chamber through annular passage 69 is directed to conduit 63 leading to the forward end of the power cylinder through the annular passage 68 while the fluid exhausting from the rearward end of the power cylinder through line 62 is directed into the annular passage 70 then through the annular passage 71 and out of the exhaust line 76. When the spool 80 is shifted rearwardly within the shuttle valve structure, valve 86 moves to the rearward side of pressure inlet passage 69 and now directs the incoming fluid into the rearward end of the power cylinder through passage 70 and exhausts the fluid from the forward end of the power cylinder through annular passages 68 and 67.

One of the features of the present invention is the means for shifting the spool 80 within the shuttle valve structure to reverse the direction of flow of pressurized fluid to the power cylinder 58 and hence reverse the direction of tree-shaking movement of the gripping assembly 24. This is accomplished through the pipelines 45 and 46 which are steel conduits and act as power-transmitting members, being firmly attached to the gripping assembly 24 through the clamp cylinder 35 and the cylinder head 50, respectively. These pipelines extend rearwardly in parallel relationship overlying the upper surface 52 (FIG. 1) of the boom housing 37. They are retained together by means of a plurality of tie blocks 88 and are guided for movement upon the surface 52 by a bearing block 89 (FIGURES 1 and 2C). The rearward ends of these pipelines extend on opposite sides of a bracket 95 and are welded in openings in a triangularly-shaped mounting block 91 (FIGS. 3 and 4). Flexible conduits 45a and 46a are also secured in openings in block 91 and communicate respectively with pipelines 45 and 46.

A shuttle drive or overtravel assembly 92 (FIG. 3) is centrally mounted in block 91 and is slidable along an axially extending rod 94 that is bolted by means of the bracket 95 and a bracket 98 to the upper surface 52 of the boom housing 37. The shuttle drive assembly consists of a cylinder 93 welded in an opening in the triangular block member 91 and enclosing a spring 96 that is disposed about a second cylinder 97 that is slidable upon the guide rod 94. The spring 96 is positioned between two bushings 99 and 100 and retainer rings 103 hold the spring and the bushings in the cylinder 93. Two tubular spacers 102 are mounted on cylinder 97, one spacer being disposed between bushing 100 and a snap ring 104, and the other spacer 102 being disposed between bushing 99 and a drive arm 105 which is held on cylinder 97 by a snap ring 104a. The drive arm 105 extends through a slot 107 in the top surface 52 of the boom housing and has a lower cylindrical end fitted in an upwardly opening socket 108a formed in a striker member 108 that has a tubular portion 108b which receives a valve shifting rod 109 which extends along the axis of the boom. The rod 109 is bolted to the spool 80 adjacent the rear stop member 81 so that axial movement of the rod 109 results in the desired axial movement of the valve spool. The forward end of the rod 109 includes a section 111 containing right-handed threads and a slightly spaced section 112 containing left-handed threads. Each threaded section 111 and 112 supports a nut 113 which has been threaded thereon and which is prevented from rotating within the boom by the inlet and exhaust lines 75 and 76 (FIG. 4). Rotation of the rod 109 causes the nuts 113 to either move closer together or further apart depending upon the particular direction of rotation, and the distance between the nuts 113 corresponds to the length of the stroke of the shaking mechanism since these nuts serve to effectively limit the movement of the shuttle actuating arm 105 and reverse the shuttle valve 65.

The rod 109 is movable axially under the urging of the arm 105 to move the spool 80 of the shuttle valve into two separate positions for directing the hydraulic fluid to opposite ends of the power cylinder 58, and these two positions are defined by a pair of circumferential grooves 115 and 116 on the spool. A pair of ball detents 118 are engaged in one or the other of the grooves on opposite sides of the spool and are urged into tight engagement with that groove by backup springs 120 so that a certain amount of force will be required to shift the spool within the shuttle valve.

The shifting of the valve spool 80 is accomplished through the steel pipelines 45 and 46 moving with the gripping assembly 24, as previously mentioned. This movement is tranmitted to the actuating arm 105 and the striker 108 through the mounting block 91. When the striker 108 engages one of the nuts 113, the spring 96 within the overtravel assembly 92 will tend to be compressed as one or the other of the bushings 99 or 100 slide along the surface of the cylindrical member 97 under the urging of the moving cylinder 93 acting through the snap rings 103. The force imposed on the nut 113 which is engaged by the striker increases until it reaches a predetermined amount, at which time the force imposed by the ball detents 118 is overcome and the valve spool is shifted. The resultant "snapping" action of the shuttle valve in moving to its alternate position is important since it means that the shuttle valve will never be stopped in an intermediate position with the valve 86 blocking the inflow passage 69 wherein the shaking mechanism could not be started. This action is further assured by the fact that the spring 96 is required to be compressed a certain distance to provide sufficient force to overcome the force imposed by the ball detents, which distance is greater than the distance between the centers of the grooves 115 and 116.

As previously mentioned, the hydraulic fluid lines 45 and 46 for operating the clamping pad 31 communicate through the mounting member 91 with flexible hoses 45a and 46a, respectively (FIG. 4). These hoses are connected at their lower ends into opposite sides of a block 125 that is bolted to the underside of a channel 127 secured within the boom housing 37 at its rearward end. The hoses 45a and 46a communicate, by means of separate fluid passages within the block 125, with lines 45b and 46b, respectively, which extend along the interior bottom wall of the boom housing. Since the hoses 45a and 46a are quite flexible, they permit relative motion between their respective terminal points as the gripping assembly 24 is reciprocated with respect to the boom 26.

The rod 109, which carries the nuts 113 for determining the operating stroke of the shaking mechanism and must be rotated to change the setting of nuts 113, is permitted to move axially to allow for the shifting movement of the valve spool 80 by means of a key 131 (FIG. 2B) that is carried by the rod 109 and is disposed in a slot in a sleeve 132. A short rod 109a, which is supported by a pair of bearing members 134 that are bolted to the channel 127, is bolted to sleeve 132 and is bolted to a tube 136 which extends to the rearward end of the boom (FIG. 2A) where it terminates in an end portion 137 of square cross-section that is slidably received in a square opening in an end closure plate 138a of a second, axially aligned tube 138. Tube 136 is supported for rotation at the rearward end of the boom by a bearing 139 which is mounted upon a flange 141 extending upwardly from the lower wall of the boom housing. The second tube 138 is axially movable with respect to the square-shaped end portion 137 to allow for relative movement between the boom and the cylindrical housing 22 and extends centrally through the control section 28 of the mechanism and through a panel 142 at the end of the mechanism where it is mounted in a bearing 143. The end of the tube 138 which projects through the bearing 143 is fixed to a hand wheel 144. It will be seen that rotation of this handwheel will result in corresponding rotational movement of each of the tubes 138 and 136, and in the rod 109 to rotate the oppositely threaded sections 111 and 112 of the rod so that the nuts 113 will be moved either further apart or closer together to thus fix the stroke of the mechanism.

The square-shaped boom housing 37 is slidably mounted within the outer cylindrical housing 22 by means of two longitudinally spaced sets of outwardly extending channels 146, each set consisting of four individual channel members secured to the four sides of the boom housing 52. One set of channels 146 is shown in FIG. 2A adjacent the rearward end of housing 52 and the other set is shown in FIG. 2B adjacent the forward end of housing 52. A roller bearing 148, bolted to the interior of the outer housing 122 and projecting inwardly, is provided for reception in each of the channel members to guide and support the boom.

A rubber bumper 150 (FIG. 2A) is secured to the upper surface 52 of the boom housing 37 at the rearward end thereof and is freely received within a slot 151 provided in the outer housing 22. Should the boom overtravel due to unusual operating conditions or due to breakdown of some of the components of the shaking mechanism, the shock will be largely absorbed by the engagement of the bumper with the edges of the wall defining the slot 151, therefore, the control elements within the control section 28 are prevented from becoming damaged. The rearward end of the boom also mounts a pair of elbow fittings 154 (one only being shown) for securing the rearward ends of the fluid pressure inlet line 75 and the exhaust line 76, and elbow fittings 155 (one only being shown) for securing the rearward ends of lines 45b and 56b supplying fluid to the clamp cylinder 35. The inflow line 75, is provided with a check valve 157 (FIG. 2B), the purpose of which will later be made clear in the description of the operation of the mechanism. The lines 75, 76, 45b and 46b communicate with flexible hoses 75a, 76a, 45c, and 46c, respectively, through the fittings 154 and 155, the rearward ends of these hoses being directed to the control section 28 through the panel 165.

The control section 28 at the rearward end of the shaking mechanism 10 contains three manual controls for operating the mechanism. A speed control valve 166 receives the input fluid flow from the pump P and directs either a portion or all of this flow to the main feed line 75 through the hose 75a. The speed control valve is manually operated by a handle 168 mounted at the side of the control section. Pivotal movement of the handle 168 rotates a shaft 169 which, in turn, rotates a lever 170, a link 171, and a lever 172 to turn a shaft 173 which is associated with a valving device operating in a well known manner to control the flow from the valve member.

A second manual control means for the shaking mechanism is the clamping valve 175 which opens or closes the gripping assembly 24 by directing hydraulic fluid into hoses 45c or 46c, respectively. The clamping valve is controlled by a handle 176 (FIG. 1) mounted on the opposite side of the control section from the speed control handle 168 and having a similar mechanical linkage assembly 177 to control a shaft 178 associated with a valving device within the valve structure for controlling the direction of flow through the valve in a well known manner.

A third manual control mounted upon the end panel 142 is the hand wheel 144 for setting the stroke length as has already been described.

The input of hydraulic fluid under pressure from the pump P to the hydraulic system of the shaking mechanism is accomplished by a hose 180 (FIG. 1) connected at one end to the pump and at its other end to a pipe 180a (FIG. 2A) extending the exterior surface of the housing 22 (FIGS. 1 and 5). Exhaust of fluid from the system is achieved to a similar fashion by means of a pipe 182a extending along the housing 22 and a hose 182 connected to the pipe and to the fluid reservoir R. As seen in FIGURE 2A, the inflow pipe 180a is provided with a hydraulic surge accumulator 186 for a purpose later to be explained.

One further device which is incorporated into the shaking mechanism of the present invention is a boom centering device, the function of which is best shown in FIGURE 6. When the clamping pads 30 and 31 are in their open position as seen in FIGURE 2D, it is desirous to have the boom 26 and hence the actuating arm 105 in a centered position so that the tree limb T that is grasped against the fixed clamping pad 30 will be reciprocated the same distance in both the forward and reverse directions during the shaking stroke. In order to accomplish this, a dual hydraulic cylinder 188 (FIG. 2A) having two separately driven piston rods 190 and 191 (FIG. 6) is hydraulically connected with and arranged to operate in conjunction with the clamp cylinder 35 controlled by the clamping valve 175 in a manner which will later be described in more detailed in connection with the description of the hydraulic circuit and the operation of the shaking mechanism. When the clamping pads are separated or in the open position (FIG. 2D), the piston rod 190 is projected and the piston rod 191 is retracted until the piston rods are approximately aligned as shown in FIGS. 2A and 6. At this time, an enlarged portion 192 at the leading end of the piston rod 190 and a flange 193 carried by an enlarged portion 194 at the leading end of the piston rod 191 are arranged to engage the opposite sides of a plate 196 connected to the rearward end of the boom housing 37. The plate 196 includes a slot 197 which permits the enlarged portion 194 of the piston rod 191 to extend to the forward side of the plate. The resultant clamping action of the piston rods 190 and 191 results in the boom being brought into its exact centered position each time that the clamping pads are separated. When the clamping pads are closed upon a tree limb, the piston rod 190 is retracted and the piston rod 191 is projected so that the plate engaging portions 192 and 193 of these pistons are separated by a distance greater than the maximum stroke of the shaking mechanism whereby the centering device does not interfere with the reciprocating operation of the mechanism.

The operation of the shaking mechanism of the present invention will be described with relation to FIGURE 7 which shows the hydraulic circuit and some of the mechanical operating elements, all of such elements being shown schematically. Hydraulic fluid is delivered to the system through the pump P operated by the motor M, the input entering the system under a predetermined pressure through line 180. When the operator of the mechanism has selected a tree limb or trunk to be shaken, the handle 176 is moved to actuate the clamping valve 175. As diagrammatically shown in FIG. 7 this valve is of the type in which pivoting movement of the handle 176 causes sliding movement of a spool inside the valve housing. A suitable valve of this type is identified as type PK–75 marketed by Gresen Mfg. Co. of Minneapolis, Minn. This valve has three positions corresponding to a clamping position of the gripping assembly 24, an open position of the gripping assembly 24, and a locked position wherein the fluid in the clamp cylinder 35 and its feed lines 45 and 46 is cut off from the input flow line 180 to thus "lock" the clamping pads 30 and 31 in position. This latter position is the position showed in the schematic diagram of FIGURE 7. When it is desired to close the clamping pads about the tree limb, the handle 176 is moved to shift the valve member to the right (as seen in FIGURE 7) and direct the inflow from line 180 to line 46 to move the piston 41 and hence the clamping pad 31 in the forward direction to tightly grip the tree limb between the pads 30 and 31, at the same time exhausting fluid from the forward end of the clamp cylinder 35 through exhaust line 45 and through the clamping valve to a line 201 where it is redirected to the speed control valve 166. Once the clamping pad 31 is in tight gripping position and sufficient pressure has been built up in the inflow line 46 to the clamp cylinder, a pressure regulator 202 will open to allow the input from the pump to bypass the clamping valve and be fed directly to the speed control valve. A pilot operated check valve 204 is provided in the line 46 so that shock forces imposed upon the clamping pad 30 during the shaking action will not result in its losing its grip upon the tree limb. Furthermore, the clamping valve circuit may be isolated during the operation of the shaking mechanism by moving the clamping valve to the neutral or bypass position of FIG. 7 wherein the inflow fluid is passed directly from line 180 to line 201 and to the speed control valve 166. When it is desired to open the gripping assembly 24, the handle 176 is rotated to move the valve member to the left (as seen in FIG. 7) to direct the inflow along line 45 to the forward end of the clamping cylinder. A portion of the fluid in line 45 is directed into an offset line 205 which opens the pilot operated check valve 204 in the well known manner so that the fluid will be exhausted from the rearward end of the clamp cylinder along line 46.

Operated in conjunction with the clamp cylinder 35 is the dual boom centering cylinder 188, shown in FIG. 7 as being comprised of two cylinders 188a and 188b. A hydraulic line 207 is connected with the line 45, and a hydraulic line 208 is connected with the line 46. Line 207 directs fluid to the rearward end of cylinder 188a and to the forward end of cylinder 188b to move the piston rods 190 and 191 into their aligned position wherein the plate 196 is tightly gripped between the two piston rods and the boom is centered. The fluid line 208 directs fluid to the forward end of cylinder 188a and to the rearward end of cylinder 188b to move the piston rods into their non-aligned position wherein the boom is freed for reciprocation. It can be seen that the boom will be clamped only when the gripping assembly 24 is in its open position since, when the gripping assembly 24 is moved to a closed or tree limb engaging position, the line 46 will be pressurized to release the boom centering device. As previously mentioned, the boom centering device therefore provides for easy positioning of the gripping assembly 24 upon the tree and automatically centers the stroke of the boom with respect to the tree limb to be shaken. Furthermore, such a centering device prevents movement of the boom while the shaking mechanism is adjusted in position.

Once the gripping assembly 24 is securely attached to the limb to be shaken, the oscillatory shaking movement may be started by means of the speed control valve 166 which is a device that divides the incoming fluid between the main feed line 75 to the shuttle valve 65 and a line 210 returning the fluid to the reservoir R. This valve is of the type in which swinging movement of the handle 168 causes reciprocation of a valving element which permits flow through the valve. This action is schematically shown in FIG. 7 as a movable spool. A suitable valve is identified as type FC–51 marketed by Brand Hydraulics of Omaha, Nebr. The pressure of the fluid entering the main feed line 75 is controlled by a pressure regulator 212 which opens under a predetermined maximum pressure and directs the excess fluid back to the reservoir. Since the speed control valve 166 is a metering device measuring the fluid flow to the feed line 75, it can be seen that this valve will control the speed and the frequency of oscillation of the shaking mechanism for a given stroke length.

The fluid in the main feed line 75 is pumped through the check valve 157 and the shuttle valve 65 alternately to oposite ends of the power cylinder 58 through lines 62 and 63 to reciprocate the gripping assembly 24. When the shuttle valve 65 is snapped into one of its two positions through the engagement of the actuating arm 105 with one of the nuts 113 on the threaded stem 109, the inflow from line 75 will be instantly reversed from one of the lines 62, 63 to the other line. However, since the piston 60 traveling within the power cylinder cannot be instantaneously stopped and reversed, it will continue to move in its initial direction against the hydraulic fluid feed from the shuttle valve. This will cause a considerable build-up of back pressure in the feed line 75, and, therefore, the shock accumulator 79 has been provided in the line to absorb the excess hydraulic fluid which results from the continued movement of the piston 60 after the reversal of the shuttle valve. The check valve 157 prevents the fluid from reversing its direction of flow in the feed line 75 back through the speed control valve during this deceleration action. However, as the pressure is thus built-up on the downstream side of the line check valve 157, the pump P will continue to supply fluid to the system. In order to accommodate this excess fluid, which cannot get past the closed check valve 157, and in order to prevent the wasting of the power delivered from the pump, the surge accumulator 186 is provided in the inflow line 180. It can be seen that the pressure regulator 212 must be set high enough so that it will not open due to the increased pressure in the lines 75, 201, and 180 during this deceleration period of the piston 60, when the shock accumulator 79 and the surge accumulator 186 are filling. Once the piston 60 has been stopped within the power cylinder 58, it will immediately be accelerated in the opposite direction. This acceleration will be started by the high-pressure hydraulic fluid stored in the shock accumulator 79 and added to by the fluid in the surge accumulator 186 when the pressure in the shock accumulator has lowered enough to allow flow thru the check valve. The net result of the aforedescribed action is that the tree limb and gripping assembly mass is very rapidly decelerated from its maximum velocity and then subjected to a very high acceleration during the initial portion of the return stroke as the kinetic energy of the deceleration of the piston, which was stored in the shock hydraulic accumulator in the form of potential energy, is returned to the system. This means that the maximum acceleration and deceleration occurs at the ends of the stroke whereby a very effective jarring of the tree limb is accomplished.

It will be recognized that the spring 96 (FIG. 3) within the overtravel assembly 92 must be compressible enough to allow for that overtravel movement which occurs after the shifting of the shuttle valve during the aforedescribed deceleration period as well as for that compressive movement which occurs before the shifting of the shuttle valve in preloading the stem 109. Spring 96, therefore, must be designed to permit the maximum deceleration movement to be expected.

Rotation of stem 109 through the hand wheel 144 results in adjustment of the length of the stroke of the shaking mechanism in the manner previously outlined, and this adjustment may be made while the mechanism is running. Of course, the changing of the stroke length will also change the frequency and speed of the shaking mechanism; however, these factors may be adjusted independently of the stroke by the speed control valve 166 up to a maximum speed-stroke ratio.

An important feature of the hydraulic system of the present invention is the provision of the shock accumulator 79 and the surge accumulator 186 in the input flow line to the power cylinder. These energy storing devices permit the power output from the pump to be put to the most effective use in generating shock forces in the tree limb. The surge accumulator 186, for example, performs three separate functions. First of all, it provides a means of using all the hydraulic fluid and pressure which is pumped by storing it during the deceleration of the gripping assembly and tree mass. Secondly, it raises the pressure of the main feed line 75 on the upstream side of the check valve 157 to a point where equilibrium and flow through the check valve occurs sooner upon the reversal of the direction of movement of the piston 60 whereby acceleration is picked up initially at a faster rate. Thirdly, it provides a variable flow to the pressure side of the piston 60 to assure a constant acceleration during the initial portion of the piston stroke.

It can be seen that the shock forces in the instant invention are determined primarily by the method in which the gripping assembly is quickly stopped and reversed in direction. The benefits of energy storage wherein the energy of the moving mass is converted into potential energy, stored, and then reconverted back to kinetic energy by the hydraulic fluid accumulators are very great. For example, at least twice the power would have to be provided if a simple two-way valve were used with a standard reciprocating piston arrangement wherein appreciable power is lost at the ends of the stroke.

While one embodiment of the present invention has been shown and described, it will be understood that various changes and modifications may be made therein without departing from the spirit of the invention or the scope of the appended claims.

The invention having thus been described, what is believed to be new and desired to be protected by Letters Patent is:

1. A shaking mechanism for applying shock forces to an object held thereby, said mechanism comprising a gripping head for securely gripping said object, a power cylinder, a piston reciprocable within said cylinder, said piston being connected with said gripping head, and means for alternately directing hydraulic fluid to opposite ends of said cylinder to reciprocate said gripping head, said means including a pair of hydraulic lines arranged to separately communicate with said opposite ends of the cylinder for alternately feeding and discharging said hydraulic fluid therefrom.

2. A shaking mechanism for applying shock forces to an object held thereby, said mechanism comprising a gripping head for securely gripping said object, a power cylinder, a piston reciprocable within said cylinder, said piston being connected with said gripping head to directly effect the movement thereof, a valve means having two operating positions for alternately directing hydraulic fluid to opposite ends of said cylinder to reciprocate said gripping head, a pair of hydraulic lines separately communicating with said opposite ends of the cylinder, said lines being connected to said valve so that they alternately receive hydraulic fluid when the valve is alternated between its two operating positions, and means operatively connecting the gripping head and the valve means for shifting the valve means from one of its positions to the other upon the making of a stroke of a predetermined length by the gripping head.

3. A shaking mechanism for applying shock forces to an object held thereby, said mechanism comprising a gripping head for securely gripping said object, a power cylinder, a piston reciprocable within said cylinder, said piston being connected with said gripping head to directly effect the movement thereof, a valve means having two operating positions for alternately directing hydraulic fluid to opposite ends of said cylinder to reciprocate said gripping head, a pair of hydraulic lines separately communicating with said opposite ends of the cylinder, said lines being connected to said valve so that they alternately receive hydraulic fluid when the valve is alternated between its two operating positions, means operatively connecting the gripping head and the valve means for shifting the valve means from one of its positions to the other upon the making of a stroke of a predetermined length by the gripping head, and means for changing the length of said stroke, said last named means being operable during reciprocation of said gripping head.

4. A shaking mechanism for applying shock forces to an object held thereby, said mechanism comprising a gripping head for securely gripping said object, a power cylinder, a piston slidably received within said cylinder and connected with said gripping head to directly effect the movement thereof, a valve having two operating positions for alternately directing hydraulic fluid to opposite ends of said cylinder to reciprocate said gripping head, means connected to said valve for shifting the valve from one of its positions to the other, said means including a pair of spaced abutment elements, a striker member connected with said gripping head for movement therewith and being positioned so as to be movable between said abutment elements whereby the valve is shifted in response to the engagement of the elements by the striker member, and means for changing the distance between said elements, said last named means being operable during operation of the shaking mechanism when said gripping head is being reciprocated.

5. A shaking mechanism according to claim 4 wherein said means for shifting the valve comprises a rod having two, oppositely threaded sections, said abutment elements comprise a nut received upon each of said rod portions, and said means for changing the distance between said elements comprises a member arranged to rotate said rod.

6. A shaking mechanism for applying shock forces to an object held thereby, said mechanism comprising a gripping head for securely gripping said object, a power cylinder, a piston slidably received within said cylinder and connected with said gripping head to directly effect the movement thereof, a valve having two operating positions for alternately directing hydraulic fluid to opposite ends of said cylinder to reciprocate said gripping head, means connected to said valve for shifting the valve from one of its positions to the other, a member connected with said gripping head for movement therewith and being arranged to operatively engage said means for shifting the valve after the gripping head has been moved a certain predetermined distance in one direction, said means for shifting the valve including a spring-loaded means for resisting the movement thereof, and said member including a yieldable spring means which is adapted to initially yield under the resisting force of said spring-loaded means whereby said valve will be rapidly shifted under the force of said yieldable spring means when the force of the yieldable spring means overcomes the force imposed by the spring-loaded means.

7. A shaking mechanism for applying shock forces to an object held thereby, said mechanism comprising a gripping head for securely gripping said object, a power cylinder, a piston slidably received within said cylinder and connected with said gripping head to directly effect the movement thereof, a valve having two operating positions for alternately directing hydraulic fluid to opposite ends of said cylinder to reciprocate said gripping head, means connected to said valve for shifting the valve from one of its positions to the other, a rigid member connected with said gripping head for movement therewith, an element arranged to be moved by said rigid member for operatively engaging said means for shifting the valve after the gripping head has been moved a certain predetermined distance in one direction, yieldable means connecting said element to said rigid member whereby the member and the gripping head, upon the shifting of said valve, may continue to move against the flow of hydraulic fluid to said valve.

8. A shaking mechanism for applying shock forces to an object held thereby, said mechanism comprising a gripping head for securely gripping said object, a power cylinder operable by means of a hydraulic system, a piston slidably received within said cylinder and connected with said gripping head to directly effect the movement thereof, a pump for continuously supplying hydraulic fluid to said hydraulic system, said system including a shuttle valve having operating positions for alternately directing hydraulic fluid to opposite ends of said cylinder to reciprocate said gripping head, said system further including a hydraulic feed line from the pump to the valve, the feed line having a check valve therein for preventing reverse flow in the line and a hydraulic fluid pressure accumulator positioned between the check valve and the shuttle valve, and means for shifting the shuttle valve between its operating positions to stop the movement of the gripping head in one direction and to start it moving in the opposite direction with the deceleration energy of said gripping head being temporarily stored by said hydraulic accumulator and thereafter returned to the system to supply an accelerating force to the gripping head at the start of its motion in said opposite direction.

9. A shaking mechanism according to claim 8 wherein a second hydraulic fluid pressure accumulator is provided in said feed line between said pump and said check valve for storing the hydraulic fluid pumped to said system during the period of deceleration of said gripping head.

10. A shaking mechanism for applying shock forces to an object held thereby, said mechanism comprising a gripping head for securely gripping said object, a power cylinder, a piston slidably received within said cylinder and connected with said gripping head to directly effect the movement thereof, a valve having two operating positions for alternately directing hydraulic fluid to opposite ends of said cylinder to reciprocate said gripping head, means connected to said valve for shifting the valve from one of its positions to the other, a member connected with said gripping head for movement therewith and arranged to operatively engage said means for shifting the valve after the gripping head has been moved a certain predetermined distance in one direction to shift the valve and cause the hydraulic fluid from said valve to oppose the motion of said piston in said power cylinder, means for feeding hydraulic fluid to said valve including a feed line having a check valve therein for preventing reverse flow in the line, a hydraulic fluid pressure accumulator communicating with said feed line between the check valve and said first named valve and being adapted to store the excess fluid in the feed line due to the deceleration movement of said piston.

11. A shaking mechanism for applying shock forces to an object held thereby, said mechanism comprising a gripping head for securely gripping said object, a power cylinder, a piston slidably received within said cylinder and connected with said gripping head to directly effect the movement thereof, a valve having two operating positions for alternately directing hydraulic fluid to opposite ends of said cylinder to reciprocate said gripping head, means connected to said valve for shifting the valve from one of its positions to the other, a member connected with said gripping head for movement therewith and arranged to operatively engage said means for shifting the valve after the gripping head has been moved a certain predetermined distance in one direction to shift the valve and cause the hydraulic fluid from said valve to oppose the motion of said piston in said power cylinder, a pump for feeding said hydraulic fluid to said valve, a main feed line connecting said pump to said valve, said feed line being provided with a check valve for preventing reverse flow in the line and being further provided with a hydraulic fluid pressure accumulator on each side of said check valve, said accumulators serving to retain the energy of deceleration of said piston and gripping head and to retain the hydraulic fluid pumped to said system during the period of deceleration of the piston and gripping head.

12. A hydraulic operating system for a shaking mechanism capable of imposing shock forces upon an object held thereby wherein said shaking mechanism includes a cylinder and a piston reciprocable within said cylinder, said hydraulic operating system comprising a pump for feeding hydraulic fluid to said system, a shuttle valve shiftable into two separate positions for directing said fluid alternately to opposite ends of said cylinder, a feed line connecting said pump to said shuttle valve, a check valve in said feed line preventing reverse flow of said hydraulic fluid, a first hydraulic fluid pressure accumulator communicating with said feed line between the check valve and the shuttle valve and being adapted to receive fluid as the pressure within the feed line is increased just subsequent to the shifting of the shuttle valve, and a second hydraulic fluid pressure accumulator communicating with said feed line between the check valve and the pump for receiving the excess fluid delivered by the pump when the check valve is closed due to the increase of pressure on its downstream side.

13. A hydraulic operating system for a shaking mechanism capable of imposing shock forces upon an object held thereby wherein said shaking mechanism includes a cylinder and a piston reciprocable within said cylinder, said hydraulic operating system comprising a pump for feeding hydraulic fluid to said system, a shuttle valve shiftable into two separate positions for directing said fluid alternately to opposite ends of said cylinder, a feed line connecting said pump to said shuttle valve, a check valve in said feed line preventing reverse flow of said hydraulic fluid, and a hydraulic fluid pressure accumulator communicating with said feed line between the check valve and the shuttle valve, said accumulator being arranged to receive fluid as the pressure within the feed line is substantially increased during the periods just subsequent to each shifting movement of the shuttle valve while the piston is decelerated within the cylinder.

14. A shaking mechanism for exerting shock forces upon an object gripped thereby, said mechanism comprising a mounting means, a power cylinder slidably received upon said mounting means, a piston reciprocable within said cylinder, a gripping head for gripping the object to be shaken, said gripping head being connected to said piston for movement therewith, and a means for alternately supplying hydraulic fluid to opposite ends of said power cylinder to reciprocate said piston and said gripping head, said means including a pair of hydraulic lines arranged to separately communicate with said opposite ends of the cylinder for alternately feeding and discharging said hydraulic fluid therefrom, said power cylinder thereby being reciprocated upon said mounting means in opposition to the reciprocation of said piston whereby the shock forces imposed upon said object are isolated from said mounting means.

(References on following page)

References Cited

UNITED STATES PATENTS

| | | | |
|---|---|---|---|
| 1,626,068 | 4/1927 | Bartlett | 56—329 |
| 2,714,281 | 8/1955 | Steele | 56—329 |
| 3,013,374 | 12/1961 | Balsbaugh | 56—328 |
| 3,059,402 | 10/1962 | Shipley | 56—328 |

ANTONIO F. GUIDA, *Primary Examiner.*

RUSSELL R. KINSEY, *Examiner.*